No. 760,966. PATENTED MAY 24, 1904.
A. D'ALESSIO.
MEASURING DEVICE FOR GARMENTS.
APPLICATION FILED DEC. 14, 1903.
NO MODEL.
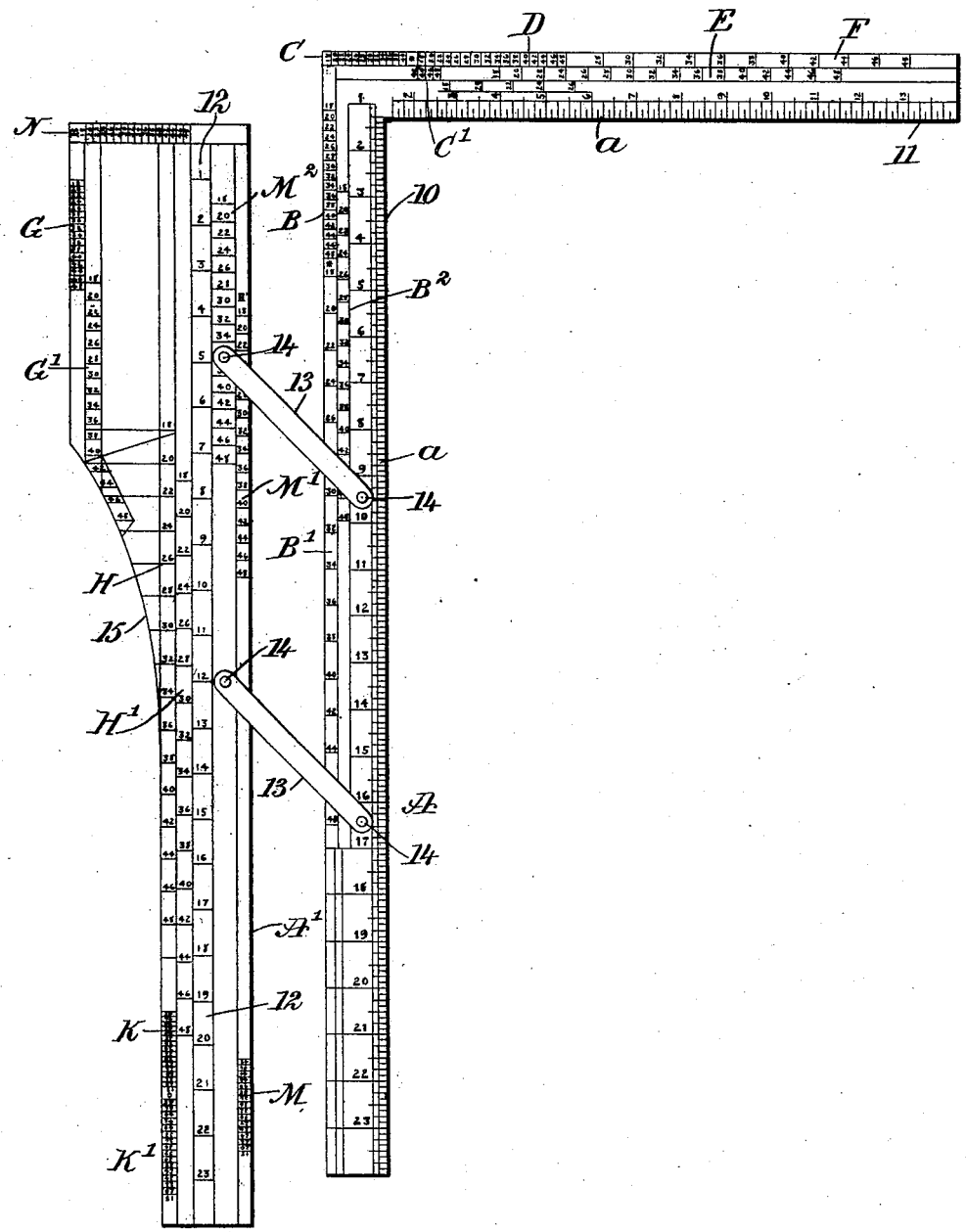
WITNESSES:
INVENTOR
Agostino D'Alessio
BY
ATTORNEYS No. 760,966. Patented May 24, 1904.

UNITED STATES PATENT OFFICE.

AGOSTINO D'ALESSIO, OF NEW YORK, N. Y.

MEASURING DEVICE FOR GARMENTS.

SPECIFICATION forming part of Letters Patent No. 760,966, dated May 24, 1904.

Application filed December 14, 1903. Serial No. 185,063. (No model.)

*To all whom it may concern:*

Be it known that I, AGOSTINO D'ALESSIO, a subject of the King of Italy, and a resident of the city of New York, borough of Manhattan, in the county and State of New York, have invented a new and Improved Measuring Device for Garments, of which the following is a full, clear, and exact description.

The purpose of the invention is to provide a measuring device or square having arbitrarily-arranged scales thereon to be read in connection with the charting of garments for men and women's wear, which device may consist of a member for determining the measurements of garments for men and a member for determining the measurements of garments for women, or wherein the two members, which may be independent, are arbitrarily connected by links or their equivalents in a detachable manner when so desired, so that the two members will not become separated, although one member is used independently of the other.

The invention consists in the novel construction and combination of the several parts, as will be hereinafter fully set forth, and pointed out in the claim.

Reference is to be had to the accompanying drawing, forming a part of this specification, in which is shown a plan view of the two members of the device connected by links in such manner that one or the other of the members may be independently used.

The main member A, which is that employed in cutting garments for men, is in the form of a carpenter's square, comprising a long arm 10 and a short arm 11, and at the inner margins of these arms 10 and 11 the ordinary scale $a$ is produced in inches and fractional portions thereof. At the outer edge of the longer arm 10 of the square A, adjacent to the intersection of said arm 10 with the arm 11, a scale B is produced, reading from "18" to "48," and the numerals of the said scale express sizes in inches. This scale B is adapted for use in obtaining the measurement of the back of the neck of a body-garment. Below the scale B and at the same edge of the longer arm 10 a scale B' is produced, reading from "18" to "48" also, and from this scale B' measurements are obtained between the armholes of the garment, and adjacent to and parallel with the scale B' a third scale $B^2$ is produced upon the longer arm 10 of the square, extending up for a distance parallel with the scale B. This scale $B^2$, which reads also from "18" to "48," terminates short of the lower end of the scale B'. The scale $B^2$ is used to obtain the short-line measurement across the shoulders. Where the arm 11 of the square A connects with the arm 10, a scale C is produced at the outer edge of the short arm 11, and this scale reads from "18" to "40," from which the measurement is obtained for the shoulder-line of the vest. A continuation C' of the scale C, reading from "48" to "42," is located between the main scale C and the scale of inches $a$. This continuation C' of the scale C is opposite the lesser member of a scale D, which is located also at the outer edge of the shorter arm 11 of the square A, and the scale D is adapted to give the measurement of the middle back of the garment. The scale D also reads from "18" to "48," but in a continuous line. Another scale E, likewise reading from "18" to "48," is located between the scale D and the scale of inches $a$ on the short arm 11 of the square A, and the scale E commences at a point about midway of the scale D and reads nearly to the outer end of the said shorter arm 11. From this scale E the measurement for the armhole of a coat is obtained. Finally, the shorter arm 11 of the square A is provided with another scale F, reading from "28" to "48," at the outer edge of the shorter arm 11, commencing at the terminal portion of the scale D. This scale F is employed to obtain the measurement of the armholes of a vest.

In connection with the square A, I employ a square A', which is in a single continuous piece, being wider at one end than at the other, and one edge of this member A' is straight, while the wider and narrower portions of said member at the opposite edge are connected by a curved line 15. This member A' of the square is especially adapted for taking measurements for women's coats, and it is provided near its straight edge with a scale 12, expressed in inches, extending practically from one end of the member A' to the other. Near the upper edge of the wider portion of the member A', parallel with the edge at which the curvature 15 is produced, a scale G is formed, reading from "18" to "48," and from this scale G the measurements for the back of the neck of a jacket, for example, are obtained. In another column, slightly removed from the edge where the scale G is produced, another scale G' is formed, reading from "18" to "48" and extending from a point near the lower end of the scale G around a portion of the curved line 15. From this scale G' measurements are obtained between the armholes across the shoulders. About midway between the side edges of the member A' another scale H is produced, also reading from "18" to "48." This scale H is longer than the scale G' and commences, for example, at a point opposite the numeral "36" on the scale G' and extends down nearly to the opposite end of the said member A'. From this scale H the short-line measurement is obtained across the shoulders, and parallel with the scale H another scale H' is produced on the said member A', reading also from "18" to "48," and the lowest numeral "18" of the scale H' is located about midway between the numerals "20" and "22" of the scale H and extends down below the lower end of the said scale H. From this scale H' the measurements for the points of the shoulders of the garment are obtained. Below the terminal of the scale H a scale K is produced, reading in a reverse direction from "18" to "48," and this scale K is at the interrupted edge of the said member A'. From this scale the position of the curves in the side and back is obtained. Below the scale K and in longitudinal alinement therewith another scale K' is produced, reading in the same direction as the scale K, also from "18" to "48." From this latter scale K' the measurements of the side sections of a garment are obtained. At the wider end of the member A' a transversely-arranged scale N is produced, reading likewise from "18" to "48," and from this scale N the height of the collar of the garment is obtained. At the straight edge of the said member A', opposite the scales K and K', a scale M is produced, reading in the same direction as the scales K and K', and from the scale M the position of the parts at the front of the garment at the right and the left beneath the armholes is obtained. At the same edge of the said member A', opposite the lower portion of the scale G', a scale M' is produced, reading also from "18" to "48" in the same direction as the scale G', and from this scale M' the measurements for the middle and center back are obtained. Finally, a scale $M^2$ is produced on the member A' at its wider end portion between the scale of inches 12 and the scale M', overlapping a portion of the scale M' and extending above it, and this scale $M^2$ reads in the same direction as the scale M' from "18" to "48," and from it the measurement is obtained from the collar to the middle back.

The square member A and the straight member A' are independently used; but these two parts are preferably adjustably connected by means of parallel links 13, pivotally attached at their ends by suitable pins 14 to the two members A and A'. The attachments of the links 13 are preferably so made that one member may be separated from the other when desired; but when the two members are connected as shown—namely, by the said links 13—one member may be employed without any interference by the connected member.

Having thus described my invention, I claim as new and desire to secure by Letters Patent—

A measuring device, comprising a member having arms of unequal length and at right angles to each other, a second member of a single piece wider at one end than at the other and having one straight edge, the wider portion of said member merging into the narrower portion on a curved line, and links connecting the members, the said members each being provided with a scale in inches and with a plurality of scales for pointing off the lines of garments, as set forth.

In testimony whereof I have signed my name to this specification in the presence of two subscribing witnesses.

AGOSTINO D'ALESSIO.

Witnesses:
J. FRED. ACKER,
JNO. M. RITTER.